United States Patent [19] [11] 3,822,031
Sterling et al. [45] July 2, 1974

[54] CONTAINER-ORIENTING APPARATUS
[75] Inventors: Walter S. Sterling, Quincy; Robert W. Vergobbi, Braintree, both of Mass.
[73] Assignee: Pneumatic Scale Corporation, Quincy, Mass.
[22] Filed: Oct. 10, 1972
[21] Appl. No.: 295,972

[52] U.S. Cl. ............. 221/10, 221/158, 221/242, 214/6 D, 271/DIG. 7, 198/33 AC, 198/33 AB
[51] Int. Cl. ........................................ B65h 9/18
[58] Field of Search ............ 221/10, 156, 157, 158, 221/171, 242; 198/62, 33 AA, 33 AC, 33 R, 33 AB; 193/31, 43; 271/88, DIG. 7; 214/6 D

[56] References Cited
UNITED STATES PATENTS
1,901,066 3/1933 Twomley ........................... 198/32
2,775,334 12/1956 Jeremiah .................... 198/33 AA X
2,857,039 10/1958 Whitecar ........................ 221/156 X
2,866,562 12/1958 Raack et al. ...................... 214/6 D
2,922,548 1/1960 Anderson ........................... 221/156
3,225,960 12/1965 Whelan ............................... 221/10
3,643,783 2/1972 Sterling .............................. 221/158
3,674,160 7/1972 Gutowski ..................... 214/6 D X
3,722,659 3/1973 Aidlin et al. ................ 198/33 AC Primary Examiner—Stanley H. Tollberg
Assistant Examiner—Joseph J. Rolla
Attorney, Agent, or Firm—Dike, Bronstein, Roberts & Cushman

[57] ABSTRACT

Apparatus for orienting elongated containers such as plastic bottles or other elongated articles. The bottles are deposited into the apparatus in a horizontal position from an intake chute without regard for the direction of the open or closed ends of the bottles and provision is made for standing upright successive bottles with their open ends up for delivery in a line to subsequent container cleaning or filling machines.

33 Claims, 18 Drawing Figures

CONTAINER-ORIENTING APPARATUS

BACKGROUND OF THE INVENTION

The invention relates to the bottling art wherein randomly arranged containers to be cleaned or filled are first aligned longitudinally and then oriented into an upright position and arranged in a line for delivery to a cleaning or filling machine.

Prior container-orienting apparatus adapted to deliver containers, such as plastic bottles, in a line to a cleaning or filling machine include the apparatus illustrated and described in U.S. Pat. No. 3,225,960 issued to James P. Whalen. Such prior apparatus comprises mechanism for positioning randomly arranged bottles end to end in a line without regard for whether the open ends are leading or trailing, in which condition the bottles are delivered to the orienting mechanism which serves to stand upright successive bottles with their open ends up and arranged in a line. While such prior container handling apparatus is efficient in use, the number of bottles oriented in a predetermined time is limited.

SUMMARY

In general, the present invention contemplates container-orienting apparatus particularly adapted for orienting relatively light weight containers, such as plastic bottles, in a rapid and expedient manner. The illustrated container-orienting apparatus comprises in general a conveyor in the form of a carrier disc or spider mounted to rotate in a horizontal plane. The disc is provided with a plurality of radially extended spaced arms defining therebetween spaced openings or pockets into which successive containers are deposited in horizontal and radially extending prone positions without regard for whether the open or closed ends are directed inwardly or outwardly. During rotation of the disc, provision is made for standing upright on their closed ends successive bottles and for releasing successive bottles in a line onto a discharge conveyor for delivery to a bottle cleaning or filling machine or to other container handling apparatus.

Accordingly, the present invention has for an object to provide a novel and improved container-orienting apparatus having provision for receiving successive elongated containers in horizontal and unoriented positions and for moving such containers into upright and oriented positions in a rapid and efficient manner.

With this general object in view and such others as may hereinafter appear, the invention consists in the container-orienting apparatus and in the various structures, arrangements and combinations of parts hereinafter described and particularly defined in the claims at the end of this specification.

BRIEF DESCRIPTION OF THE DRAWINGS

In the drawings illustrating the preferred embodiments of the invention.

DESCRIPTION OF THE PREFERRED EMBODIMENTS

Figure 1:
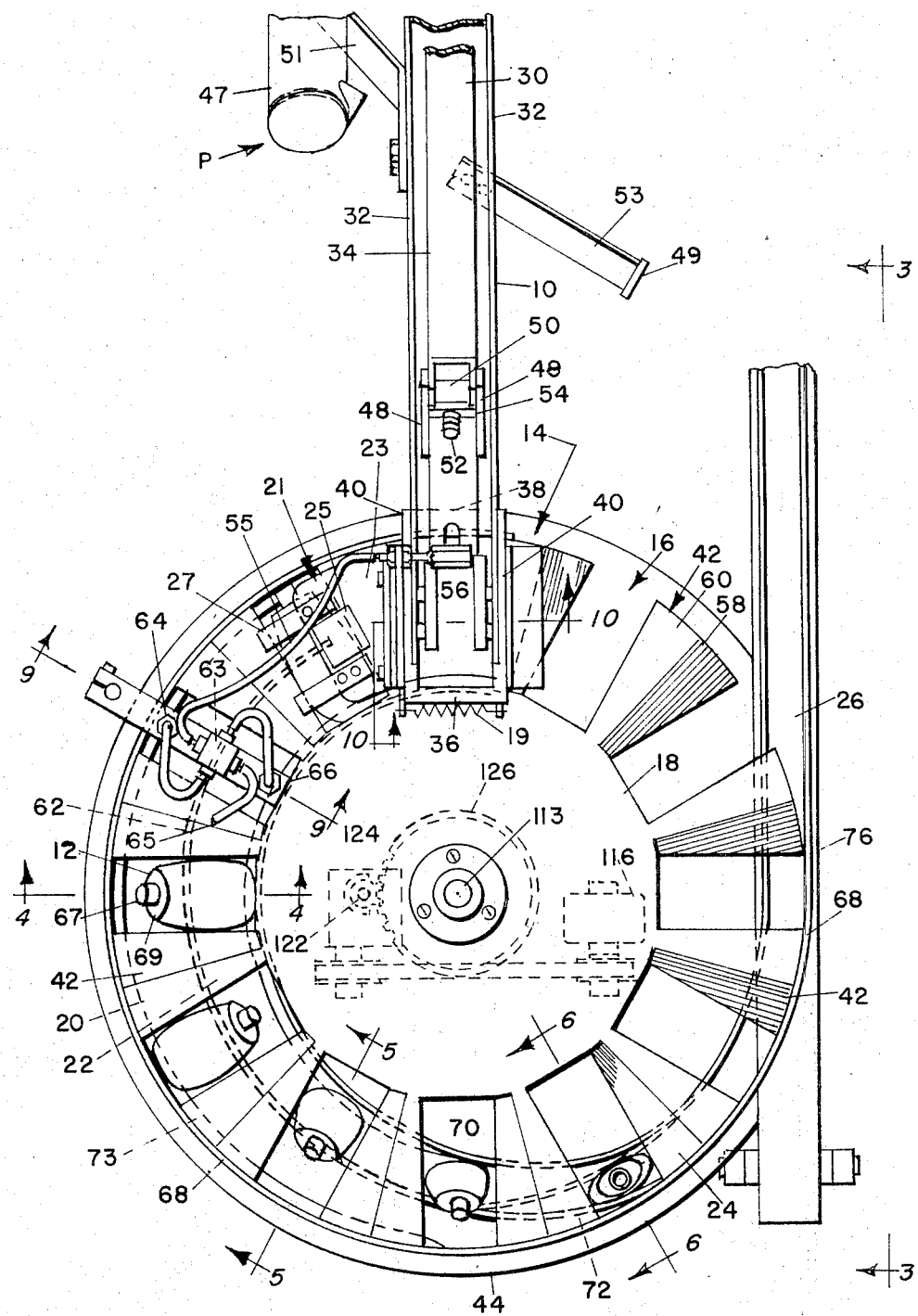
FIG. 1 is a plan view of a container-orienting apparatus embodying the present invention.
Figure 2:
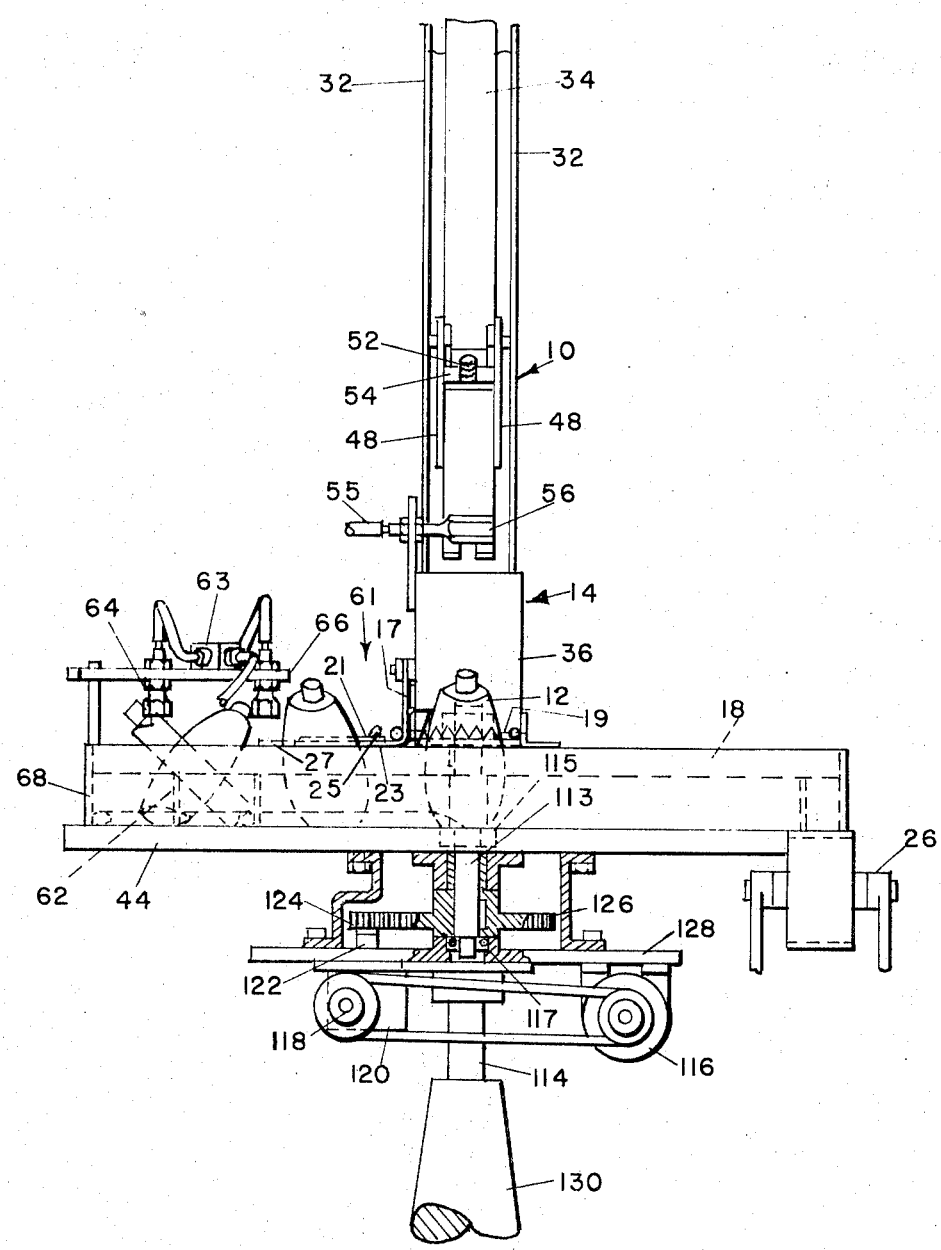
FIG. 2 is an elevation, partly in section, taken on the line 2—2 of FIG. 1.
Figure 3:
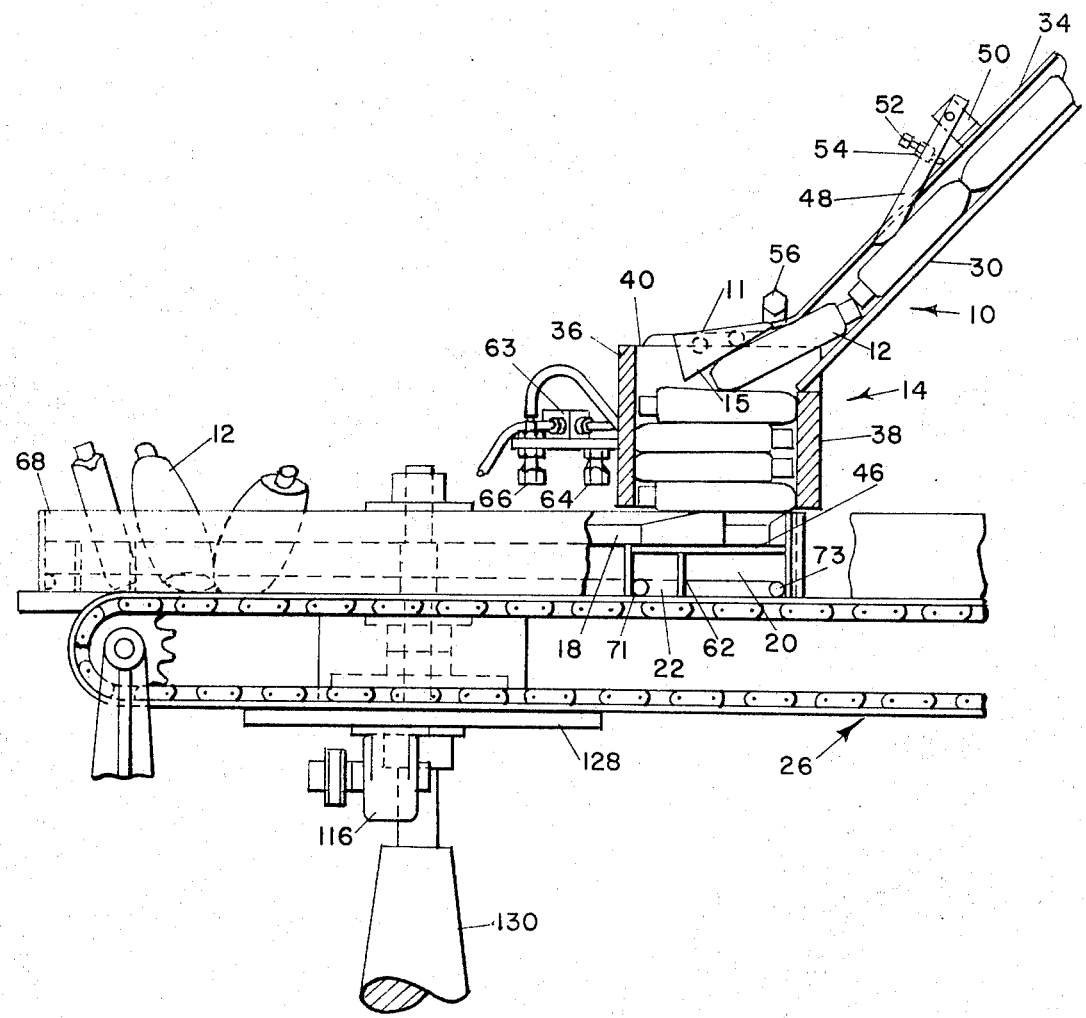
FIG. 3 is an elevation, partly in section, taken on the line 3—3 of FIG. 1.

Referring now to the drawings and particularly to FIGS. 1, 2 and 3, one embodiment of the container-orienting apparatus illustrated therein comprises in general a bottle intake chute 10 into which successive containers, such as elongated plastic bottles 12 are deposited, the bottles being aligned end to end with the open ends either leading or trailing. The bottles are guided into a magazine or hopper 14 in a horizontal position one above the other to form a short stack thereof. Successive lowermost bottles in the stack are deposited into spaced, radially extended pockets or openings 16 of a rotary conveyor in the form of a disc 18 as the latter is rotated. During continued rotation of the disc 18 provision is made for causing the bottles to assume an upright position in one or the other of adjacent arcuate pathways 20, 22 respectively, depending on whether the closed end of the bottle is directed radially outward and inward, each pathway leading to an outlet 24 wherein successive upright bottles are transferred onto a discharge conveyor 26 to form a line of bottles for delivery to a cleaning or filling machine.

In practice the containers aligned end to end may be delivered to the intake chute 10 of the illustrated machine from apparatus illustrated and described in the U.S. Pat. application of Walter S. Sterling, Ser. No. 55,135, filed July 15, 1970. Such prior apparatus comprises in general a carrier disc mounted to rotate in a horizontal plane and onto which randomly arranged bottles are deposited. In operation the bottles are urged outwardly against a retaining wall to provide a circular row of containers arranged end to end without regard for which end is leading or trailing. Successive bottles thus caused to assume a longitudinally aligned position are transferred from the carrier disc and deposited end to end longitudinally into a delivery chute which may comprise the chute 10 shown herein.

As illustrated in FIG. 1, the chute 10 may comprise a bottom rail 30, side rails 32—32 and a top rail 34, the chute being suitably supported and adjustably mounted to accommodate the cross-sectional dimensions of the bottle. In operation the bottles flow down the chute by gravity and the leading bottle is assisted in its advance into the magazine by the back pressure of the bottles in the upper part of the chute. Thus the chute guides successive bottles into the open upper end of the magazine 14, the bottles falling by gravity and under the influence of air streams into the lower end or bottom of the magazine, successive bottles being deposited one upon the other in horizontal prone positions to provide a stack thereof without regard for whether the open ends of the bottles are directed radially inwardly or outwardly.

The magazine 14 (FIG. 3) comprises a four-sided enclosure open at top and bottom having front, rear and side walls 36, 38 and 40 respectively and is disposed above and in vertial alignment with successive radial pockets or openings 16 of the rotary conveyor disc 18, successive lowermost bottles being urged downwardly into successive pockets. As herein illustrated, the pockets or openings 16 are defined by spaced radial arms 42 extended from the disc 18, the arms being disposed above a stationary circular base 44. A stationary platform 46 attached to the base 44 is disposed below the disc, the undersides of the arms 42 passing over the platform. The width of each pocket is such as to freely receive a bottle in a prone position and when the lowermost bottle is deposited in the space 16 between the arms, the bottle rests on the platform 46 temporarily as the pocket is moved away from under the magazine.

In the embodiment of the invention illustrated in FIGS. 1 to 3, the bottles flow by gravity down the chute 10 and the leading bottle is rapidly advanced into the magazine by streams of air from an air jet 56. In order to prevent upward displacement of the relatively light weight plastic bottles as they are advanced into the magazine 14, a pair of arms 48 — 48 are provided which are pivotally mounted in a bracket 50 attached to the top rail 34 of the chute 10. The forward ends of the arms 48 — 48 extend over and rest upon successive foremost bottles in the chute to hold the bottles down against the top of the stack. A set screw 52 carried by a tie piece 54 connecting the arms 48 — 48 is arranged to engage the top rail 34 of the chute to limit the downwardly rocked position of the arms. The arms 48 — 48 in engagement with the topmost bottle in the stack also tend to weight down the stack to assist in effecting transfer of the lowermost bottle in a pocket 16 aligned therewith. As herein illustrated, actual downward urging of the stack is achieved by a plurality of streams of air from an air jet 56 positioned as shown to gently force the stack downwardly in the magazine and to effect dropping of the lowermost bottle into its pocket.

A guide 11 comprising triangular-shaped plates 13—13 mounted to the inner sides of the side walls 40—40 at the top of the magazine 14 having downwardly inclined edges 15—15, guides the bottles from the lower end of the chute into the magazine and limit the number of bottles which can enter the magazine.

In the illustrated embodiment of the invention (FIG. 1), the rotary disc 18 travels in a counterclockwise direction and each radial arm 42 is provided with a long bevel 58 on the trailing side of its upper surface. Thus, in operation, a lowermost bottle in the magazine first engages the flat leading portion 60 of the upper surface of a radial arm 42 and then slides down the beveled surface 58 during continued rotation of the disc 18 whereupon the adjacent edge of the lowermost bottle engages the leading edge of a succeeding arm 42 at which time the lowermost bottle is free to drop into the pocket 16 between adjacent arms 42, the bottle thus becoming disengaged from the stack and carried along with the disc. It will be understood that in some instances, such as when the disc is rotated intermittently or at a low speed, the bevel 58 may be eliminated.

The bottle initially engaged in a pocket 16 is supported by the platform 46 as the bottle moves from under the stack and as the bottle leaves the platform it engages the upper edge of an orienting rail 62 upstanding from the base 44 and extended arcuately along the base below the pockets 16. The rail 16 is disposed to engage the bottles at a point intermediate their ends. It will be understood that the closed end or bottom of the bottle is heavier than the open end so that in operation with the bottle supported at a substantially medial point on the rail, those bottles having their closed ends directed radially outwardly will naturally rock by gravity over one side of the rail 62 to present their closed ends into the outer arcuate pathway 20, and those bottles having their closed ends directed radially inwardly will rock over the other side of the rail 62 to present their closed ends into the inner arcuate pathway 22 as shown.

Since the plastic bottles 12 are relatively light in weight, provision is made for assuring rocking or tipping of the bottles to inclined positions leaning against the rail as they are carried along between the arms 42. For this purpose a pair of jets 64, 66 connected to a source of compressed air by a pipe 65 are supported above the bottles. One jet 64 is disposed to direct a continuous stream of air downwardly at a point near the outer edge of the arcuate pathway 20 and the other jet 66 is disposed to direct a continuous stream of air downwardly at a point near the inner edge of the arcuate pathway. As thus disposed, a bottle having its closed end directed radially inwardly will be engaged by the jet 66 to positively tip the closed end of the bottle downwardly into the pathway 22. The open end of the bottle having a central neck portion 67 provides shoulder portions 69 spaced inwardly from the jet 64 so that the bottle will not be affected by the latter. Conversely, a bottle having its closed end directed outwardly will be engaged by a stream of air from the jet 64 to tip the bottle downwardly into the pathway 20, the jet 66 having no effect on the open or neck end of the bottle for the same reason above described. The air supply pipe 65 is connected to a four-way distributor 63 to which the jets 64, 66 are connected. The air jets 56 are also connected to the distributor by a pipe 55.

To prevent jamming of bottles at the lower end of the magazine there is pivotally mounted at the lower end of the side wall 40, from which the bottles are moved by the rotary disc 18, a gate 17 normally held closed by a spring 19. In the event that a bottle above that deposited in a pocket 16 is so disoriented as to be carried along by the disc 18 the gate will swing outwardly allowing the bottle to escape. To prevent upward displacement of the bottles from their pockets in the interim between leaving the platform 46 and being moved onto the rail, a flexible apron 21 is attached to the side wall 40 of the magazine above the gate, the lower portion 23 of which overrides the top of the disc and acts as a wiper which holds the bottles down in the pockets. A weight 25 in the form of a flat plate is mounted on the lower portion of the apron to press it downwardly.

It is desirable to initiate tipping once the bottles move from beneath the apron onto the rail and before they reach the air jets. To this end, fingers 27—27 are fastened to the apron so as to extend forwardly therefrom in the direction of rotation of the disc and to bear against the tops of the prone bottles. Since the fingers are of equal length and the bottles are wider at their bases than at their tips, the wider bottom ends will continue to be depressed by the fingers after the narrower upper ends have moved beyond the fingers and hence will be tipped downwardly as they approach the air jets.

Figure 4:
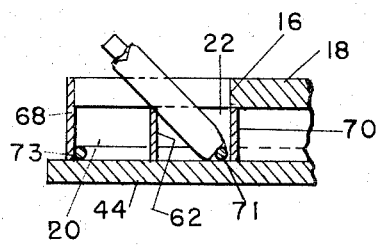
FIGS. 4, 5 and 6 are views in cross-section taken on the lines 4—4, 5—5 and 6—6 respectively of FIG. 1.
Figure 5:
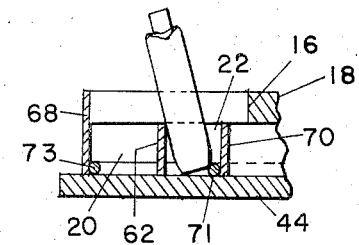

It will be observed that each bottle is disposed at an angular or leaning position with relation to the orienting rail 62 upon being rocked thereover as indicated in FIGS. 4 and 5. It will also be observed that the outer pathway 20 is defined by the gradually narrowing arcuate space between the rail 62 and an outer rail 68. Similarly, the inner pathway 22 is defined by a gradually narrowing arcuate space between the rail 62 and an inner rail 70.

Figure 6:
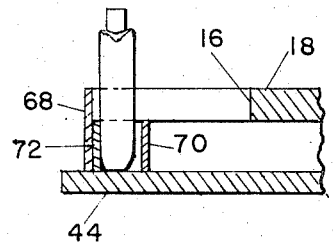
Figure 7:
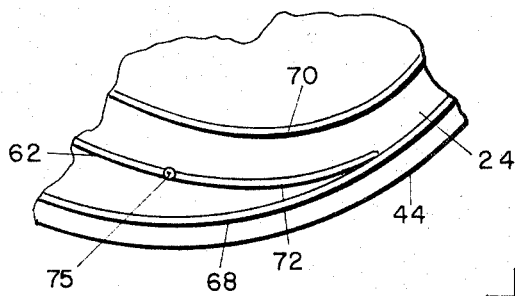
FIG. 7 is a fragmentary plan view of the guide rails and switching element.
Figure 8:
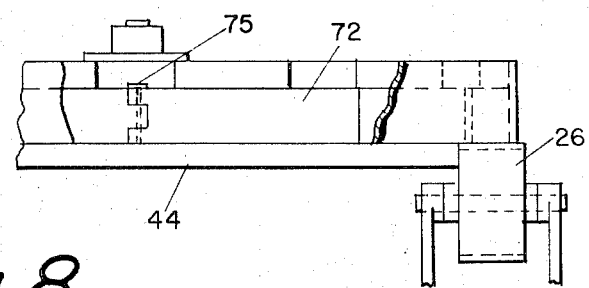
FIG. 8 is a side elevation of the guide rails shown in FIG. 7.
Figure 9:
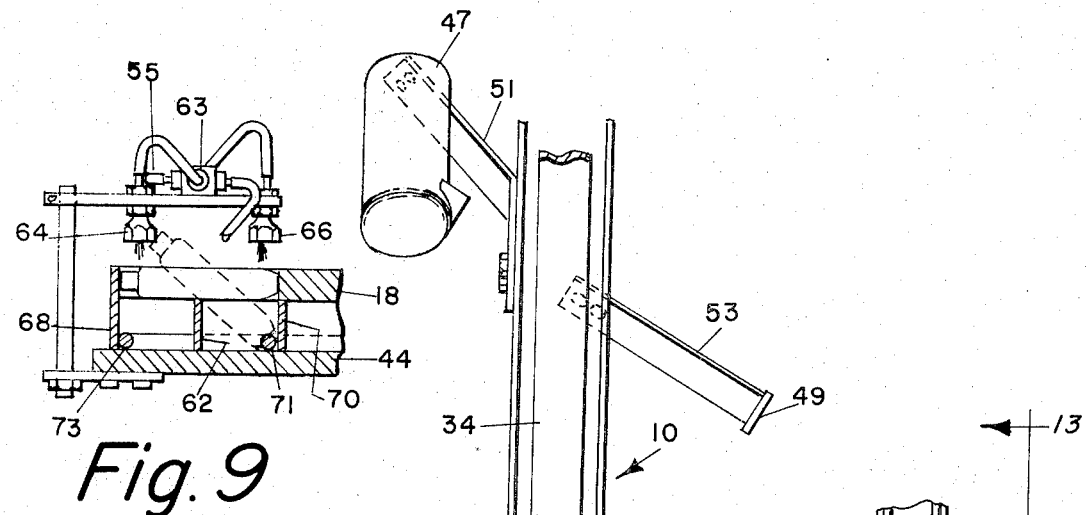
FIG. 9 is a cross-section taken on the line 9—9 of FIG. 1.

In operation, each leaning bottle being carried along between the radial arms 42 and moved through its gradually narrowing path is lifted to an upright position as indicated, the bottles in each path being guided outwardly to be carried along in engagement with the outer rail 68 as shown in FIG. 6. As herein shown, those bottles being moved along the inner arcuate pathway 22 are urged outwardly by the inner rail 70 and those bottles being moved along the outer arcuate pathway 20 are urged outwardly by the orienting rail 62. The terminating end of the rail 62 comprises a switching portion 72 which is capable of swinging to permit the bottles in either pathway to pass through the common outlet as indicated at 24 in FIG. 1. The switching portion 72 in FIGS. 7 and 8 is pivoted at 75 and will remain in its moved position on one side or the other until engaged by a bottle on the other side thereof.

In order to prevent rocking of the bottle and to assist in moving the bottles into upright positions as they are being moved along the inner rail 70, a rod 71, circular in cross-section, is provided in the pathway 22 between the lower end of the rail 70 and the base 44 and a similar rod 73 is also provided in the pathway 20 between the lower end of the rail 68 and the base 44. It will be apparent that as the bottles are moved through the gradually narrowing pathways 20, 22, the bottles will be caused to assume upright positions and that the closed ends of the bottles in engagement with the curved surfaces of the rods will be assisted into upright positions with a minimum of friction.

After passing beyond the switching portion 72, each bottle is supported between the outer rail 68 and the inner rail 70, the bottles being still engaged between the radial arms 42 defining the pockets 16. As the bottles approach a discharge point 76 where they are transferred from the base 44 onto the belt conveyor 26, the rails 68, 70 follow a path parallel to the conveyor 26 so that in operation the bottles are guided out of the pockets 16 to be carried along the conveyor 26.

From the description thus far it will be seen that the present container-orienting apparatus is capable of orienting plastic bottles delivered thereto in horizontal prone positions by causing such bottles to assume upright and oriented positions in a gentle and efficient manner.

In order to provide for a smooth operation of the orienting mechanism, a pair of reflective type commercially available photoelectric cells P are provided. One is located adjacent the feeder mechanism and is not shown in the drawings, and the other as shown in FIG. 1 is located adjacent the feed chute 10 and spaced a short distance away from the magazine 14. The latter comprises a cell 47 mounted on a bracket 51 positioned on one side of the chute and a reflector 49 similarly mounted on a bracket 53 on the other side. In normal operation when a line of bottles is backed up from the magazine 14 to or beyond the detecting mechanism 47, 49, the orienting disc is in operation. However, should the line back all of the way back to the first detecting mechanism, the feeding device is stopped. If no bottles are detected by the second detecting mechanism, the orienting disc is stopped.

Figure 11:
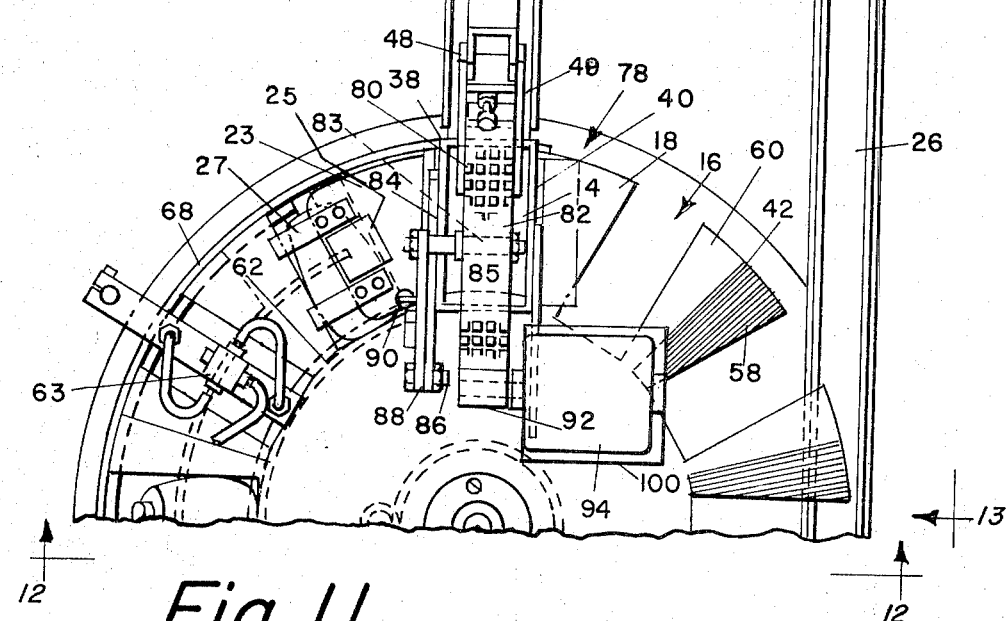
FIG. 11 is a partial plan view of the orienting apparatus showing a modified form of bottle transfer mechanism.
Figure 10:
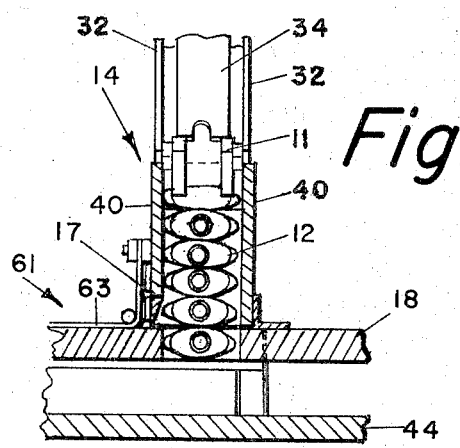
FIG. 10 is a cross-section taken on the line 10—10 of FIG. 1.
Figure 12:
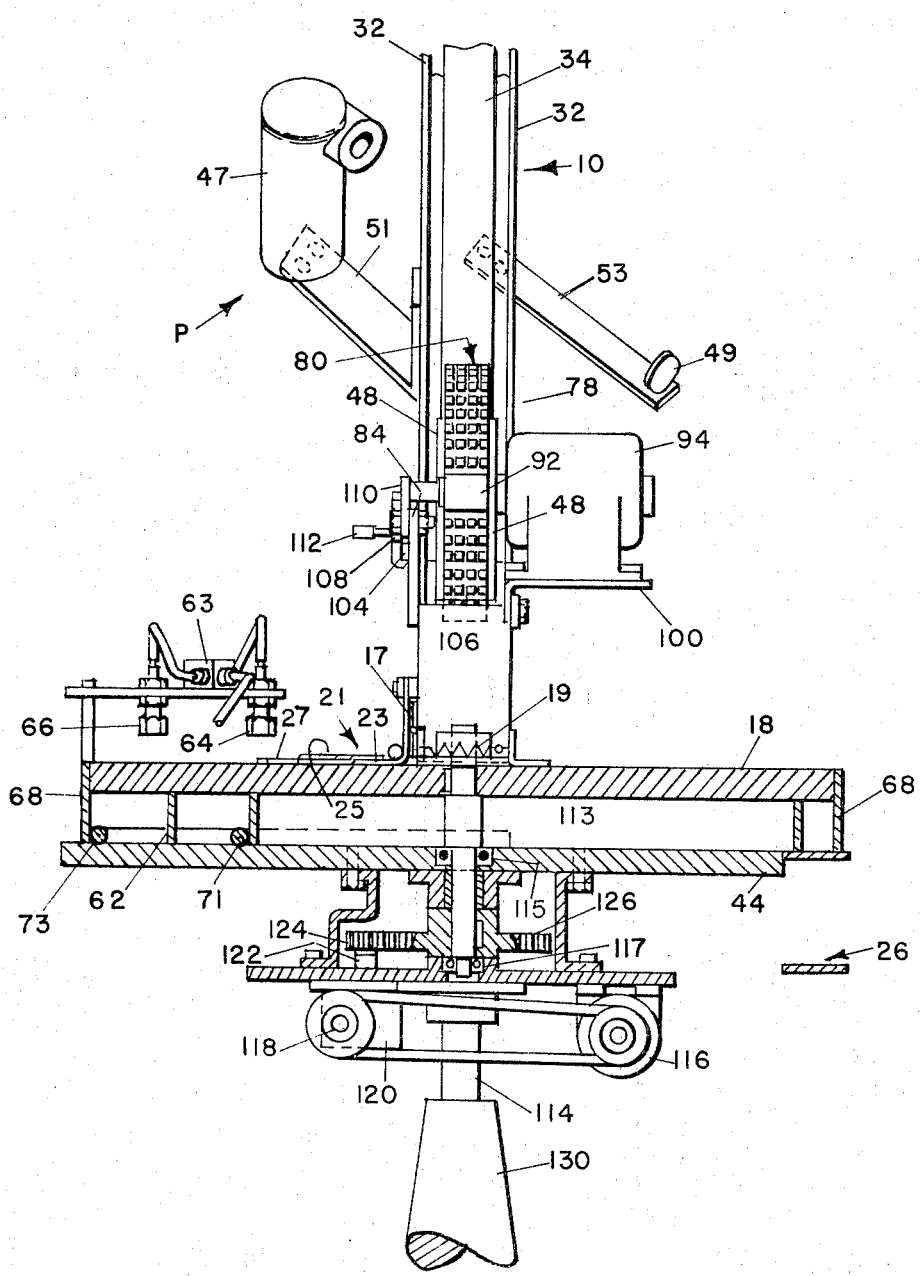
FIG. 12 is an elevation, partly in section, taken on the line 12—12 of FIG. 11.
Figure 13:
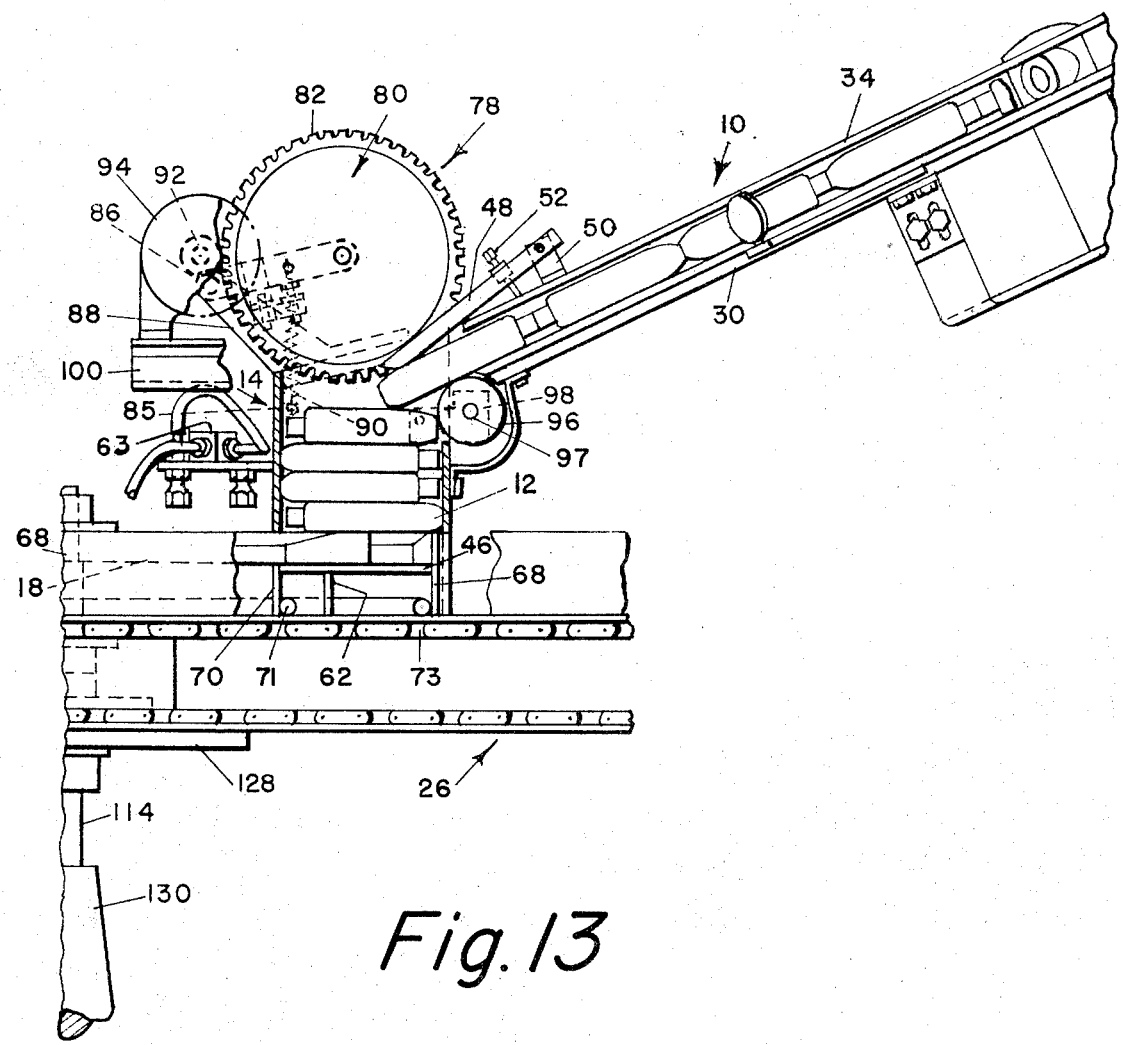
FIG. 13 is an elevation taken on the line 13—13 of FIG. 11.
Figure 14:
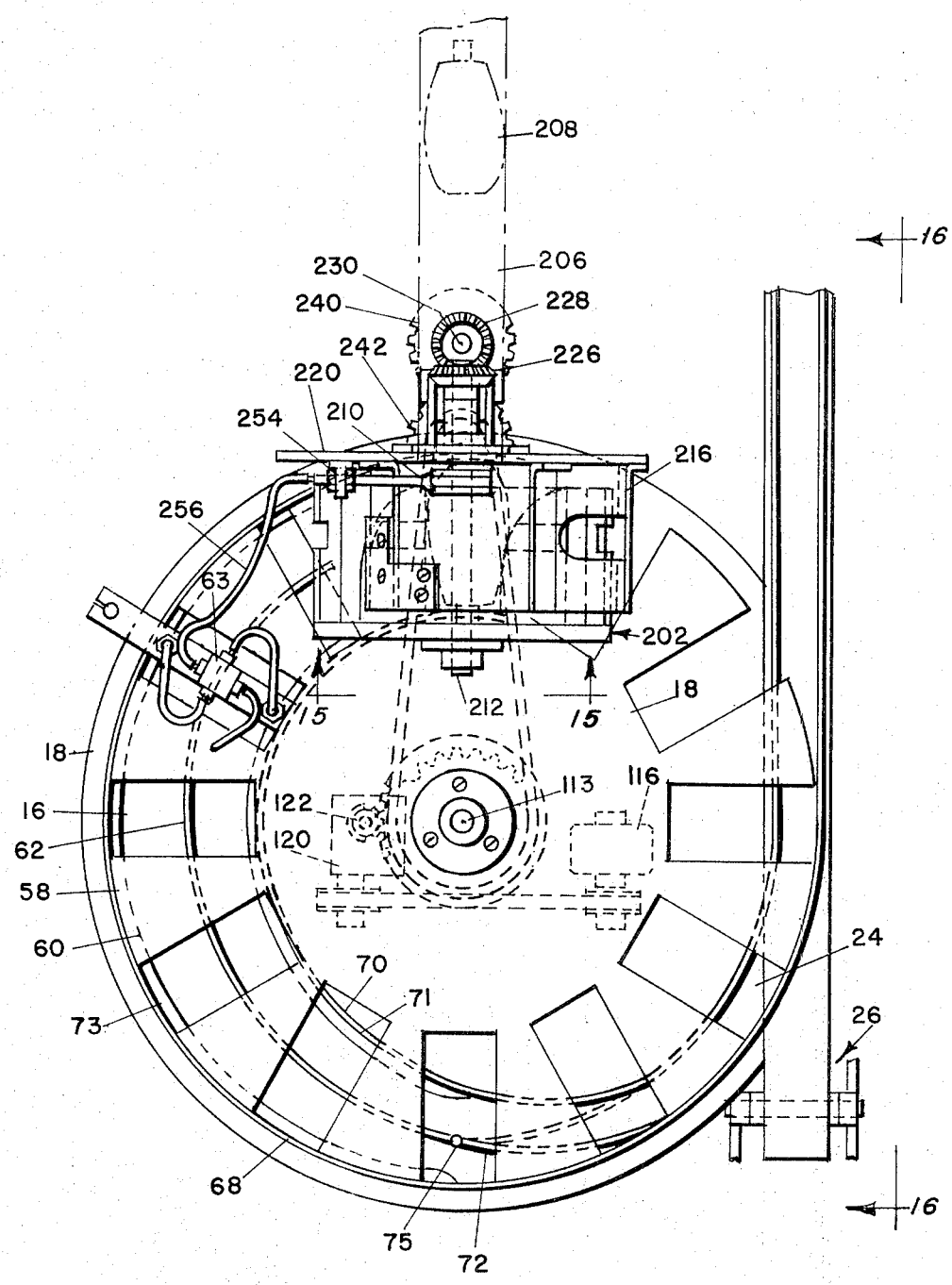
FIG. 14 is a plan view of the orienting apparatus showing another modified form of bottle transfer mechanism particularly adapted for handling odd shaped bottles.
Figure 15:
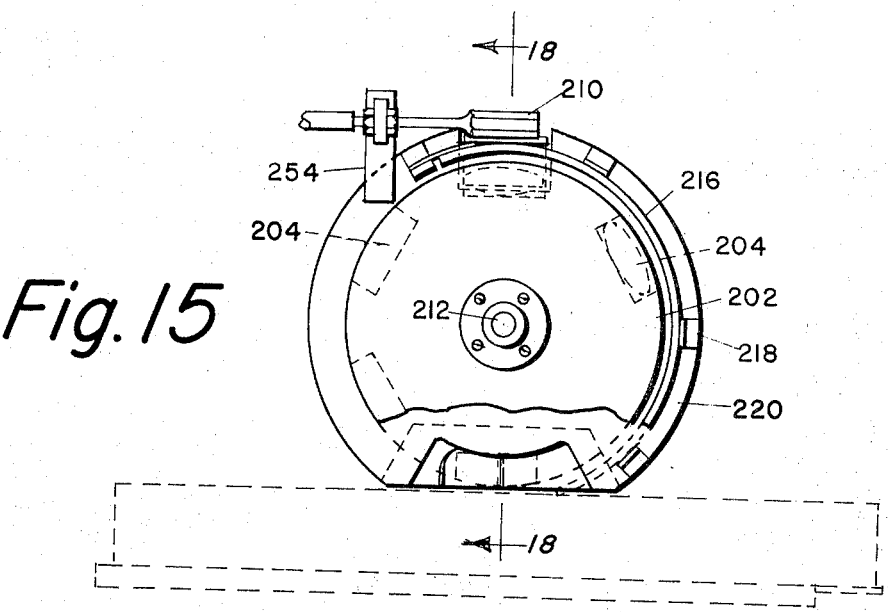
FIG. 15 is an elevation of the transfer mechanism shown in FIG. 14 taken on the line 15—15 of FIG. 14.
Figure 17:
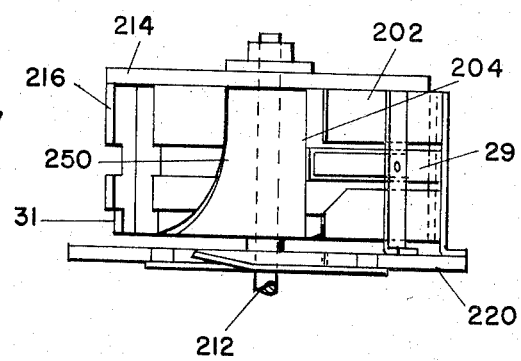
FIG. 17 is a detail veiw showing the underside of the transfer mechanism shown in FIG. 15.

In another embodiment of the invention illustrated in FIGS. 11, 12 and 13, a modified form of mechanism for depositing successive bottles into successive pockets of the rotary disc 18 is indicated generally at 78. As herein shown, the modified embodiment includes a floatingly mounted driven wheel 80 having a corrugated rubberlike covering 82 (FIG. 13) adapted to apply pressure to the top of the stack of bottles in the magazine 14. The wheel 80 is mounted to rotate freely on a shaft 83 carried bt an arm 84, the latter being pivotally mounted on a stud 86 carried by a bracket 88 attached to a side wall of the magazine 14 as shown. As thus carried, the wheel is floatingly mounted and a spring 90 connected between the arm 84 and a stud attached to a side wall of the magazine tends to maintain the wheel in engagement with successive bottles being transferred from the chute into the magazine. A set screw 102 carried by a bar 104 extended from the bracket 88 is arranged to engage the arm 84 and limit the downward rocking movement of the wheel 80. Provision is also made for limiting the upward movement of the wheel 80 comprising, as herein shown, a latch member 106 (FIG. 12) pivoted at 108 on a bar 110 attached to the arm 84. The latch member is arranged to hook under the bar 104 to stop upward movement of the wheel. The latch member 106 is provided with a weighted portion 112 to maintain the latch in operative position during normal rocking movement of the wheel and the weighted portion may be used as a handle to unlatch the wheel when it is desired to elevate the same out of operative position for any use.

A roll 92 carried by the shaft of a motor 94 is arranged in frictional engagement with the wheel 80 to effect rotation of the wheel in a direction such as to positively move the bottles presented thereto into the magazine. The roll 92 is comprised of nylon or similar plastic material so that if the friction between the surface of the wheel and the bottle at the lower end of the chute exceeds a predetermined limit, such as might scratch the surfaces of the bottles, the roll will slip relative to the wheel and the latter will stop until the pressure is released. The wheel not only assists in moving the bottles into the magazine but also applies downward pressure to limit the stack and the number which can enter the magazine from the chute. The motor 94 is supported by a bracket 100 extended forwardly from the side walls of the magazine.

With this construction it will be seen that in operation the drive roll 92 is in continuous frictional engagement with the transfer wheel 80 so that the leading bottle at the lower end of the chute 10 is engaged by the wheel and moved forwardly into the magazine 14 and when thus transferred the weight of the wheel 80 and the tension of the spring 90 serve to urge the stack downwardly to present the lowermost bottle into a pocket 16. The succeeding bottle in the chute is then permitted to advance into engagement with the rubber covered wheel 80 to be similarly advanced and lowered into the magazine 14. It will be observed that the bottles also pass under the arms 48, 49 during the advance of the same into the magazine.

It will be understood that in the above-described embodiments of the invention the intake chute 10 is kept filled with bottles so that the bottles move down the chute by gravity and the leading bottle is further urged forwardly by the pressure of the succeeding line of bottles and by air streams from the air jets. The photoelectric means P referred to above provides for stopping of the bottle orienting apparatus when the bottles in the chute approach a state of depletion and to again start the apparatus when the chute is again supplied with bottles.

It will also be understood that successive bottles 12 deposited into successive pockets 16 in the manner shown in FIGS. 11 to 13 will be supported on the platform 46 and be advanced onto the orienting rail 62 to be oriented into an upright position and transferred to the discharge conveyor 26 as described in connection with the embodiment of the invention shown in FIGS. 1 to 10.

As illustrated herein (FIGS. 2 and 12), the rotary carrier disc 18 is connected to a shaft 113 journaled in suitable bearings 115, 117. The shaft 113 is arranged to be rotated through connections from a motor 116 belted to an input shaft 118 of a speed reducing unit 120. The output shaft 122 of the speed reducing unit is provided with a pinion 124 which is in mesh with a gear 126 operatively connected to the shaft 113. The drive mechanism is attached to a platen 128 supported by a central post 114 extended from a frame member 13. In operation the disc 18 is arranged to be rotated in a clockwise direction as viewed in FIG. 13.

A further embodiment of the invention, as illustrated in FIGS. 14 to 18, is particularly adapted for handling odd shaped bottles. The modified form of mechanism for depositing successive bottles into successive pockets 16 of the rotary disc 18 is indicated generally at 200 and includes in general a continuously rotated drum 202 having a plurality of equally spaced pockets 204 in its periphery. The pockets 204 extend across the width of the drum 202 and a guideway or chute 206 (FIG. 18) aligned with successive pockets 204 as the drum is rotated, contains a plurality of bottles 208 arranged end to end without regard for whether the open end is leading or trailing. The plastic bottles 208 are advanced through the chute 206 by continuously operated air jets 210, successive bottles being transferred into successive uppermost pockets as the drum is continuously rotated. The drum 202 is operatively connected to and rotated in timed relation to the rotary disc 18 and in operation bottles in successive lowermost pockets 204 are released and deposited into successive pockets 16 of the rotary disc 18 as the respective pockets come into alignment with each other.

As herein shown (FIGS. 16 and 18) the drum 202 is mounted for rotation with a shaft 212 and is provided at one end with a disc 214 which defines the ends of the pockets 204 and serves as a stop for the bottles advanced into the pockets by the air jets 210. An arcuate outer retaining plate 216 is supported by angle brackets 218 attached to a circular side frame 220, the plate 216 serving to prevent the outward displacement of the bottles from their pockets. The retaining plate 216 contains a gap at the lower side of the drum which permits bottles carried around by the drum to drop from the pockets therein into the pockets 16 of the rotary disc 18. The shaft 212 is journaled in a bearing 222 forming a part of a bracket 224 and to which the circular side frame 220 is attached. The shaft 212 is connected by bevel gears 226, 228 to a vertical shaft 230 supported for rotation at its upper end in a bearing 232 forming a part of the bracket 224, the latter being supported by a bar 234 attached to a lower bracket 236. The lower end of the shaft 230 is journaled in a bearing 238 formed in the bracket 236 and is connected by spur gears 240, 242 to a shaft 244 journaled in a bearing 246 also formed in the bracket 236. The shaft 244 is connected by a chain and sprocket drive 248 to the drive shaft 113 of the rotary carrier disc drive.

From the description thus far it will be seen that in operation successive plastic bottles 208 are advanced into successive pockets 204 by the air jets 210. In order to permit a bottle to start its movement into its pocket 204 prior to full alignment with the chute 206 one side 250 (FIG. 17) of each pocket is curved outwardly, as shown, and further to assure full seating of the bottle in its pocket upon alignment with the chute 206, an air jet 210 is provided which effects rapid advance of the bottle and also effects separation from the succeeding bottle.

Figure 18:
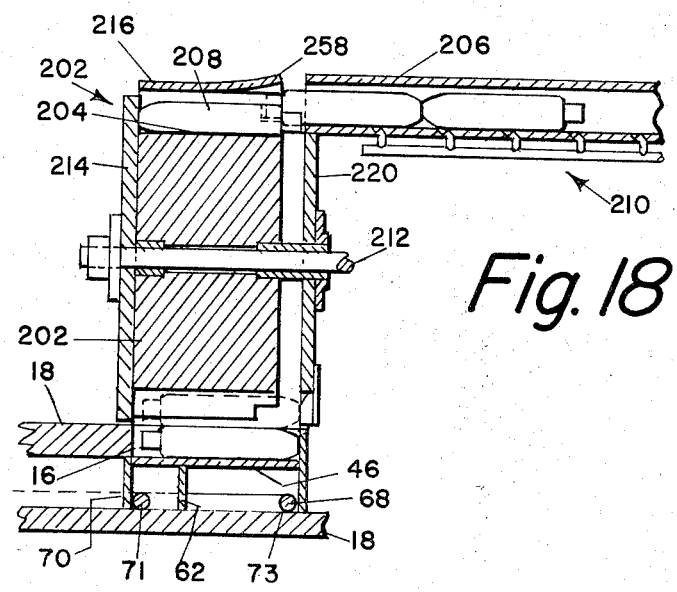
FIG. 18 is a cross-sectional view of the modified form of transfer mechanism taken on the line 18—18 of FIG. 15.
Figure 16:
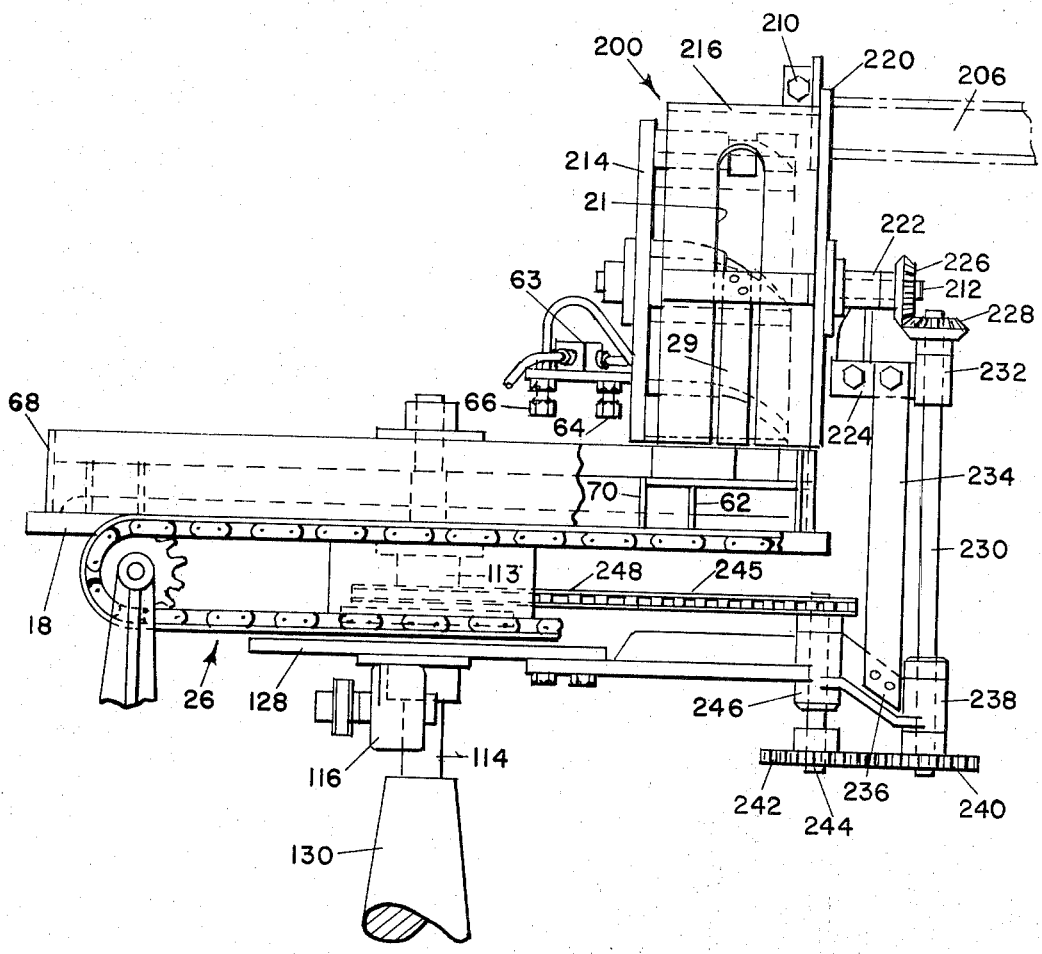
FIG. 16 is an elevation taken on the line 16—16 of FIG. 14.

It can happen that the open end of a bottle injected into the pocket 204 in the drum faces rearwardly toward the chute and that the open end of a bottle in the chute faces forwardly toward the pocket in the drum, in which event the two open ends can overlap as shown in FIG. 18. If this occurs, the drum would jam and to prevent such jamming the trailing side of the pockets 204 are provided with notches 25 deep enough so that they will clear the overlapping open end of a bottle still in the chute.

It is also desirable to prevent skewing of bottles in the pockets 204. This is achieved by providing the retaining plate 216 with a peripheral slot 21x and mounting a flat spring element 29 in the slot which encircles the drum and hugs the bottles in the pockets intermediate their ends. The spring element terminates adjacent the bottom opening of the retainer plate so as to release the bottles as they are moved in a position above the pockets in the disc 18.

As herein shown, the air jet 210 is supported in a bracket 254 attached to the side frame 220. The air jet is connected to a pipe 256 to the air manifold 63. Upon rotation of the drum 202 through 180° the bottle previously advanced into a pocket 204 will drop by gravity into a rotary carrier pocket 16. It will be noted that the retaining plate 216 is curved outwardly at one edge 258 to provide clearance for entrance of a bottle into its pocket.

The bottle thus deposited into a pocket 16 will rest on the platform 46 and be advanced onto the orienting rail 62 as previously described in connection with the other embodiments herein described to effect orientation of the bottles into an upright position with their open ends up whereupon the bottles are guided onto the conveyor or discharge belt 26.

In the aforesaid description the means for moving the containers along the track is a flat rotating disc 18 and this disc is referred to in some of the claims as a rotary conveyor; however, it is within the scope of the invention to employ a rectilinearly movable conveyor in the form of a continuous belt or chain containing spaced openings therein arranged to be moved above a straight rail rather than a curved rail for moving containers onto and along the rail and to erect the containers according to the invention by progressively moving the lower ends of the containers toward the rail as they are moved by the conveyor therealong.

Also in accordance with the aforesaid description and as illustrated the containers are shown as plastic bottles in form generally referred to as "flasks" which have substantially flat broad sides and curved narrow sides. It is to be understood, however, that containers of other shapes, for example, of rectangular or circular cross-section and tapering from bottom to top may also be oriented according to the procedure described.

From the above description it will be seen that the present bottle-orienting apparatus is capable of handling lightweight plastic bottles, initially arranged in a horizontal position in a stack without regard for the direction of their open ends, in a manner such as to cause successive bottles to assume an oriented upright position and to guide the oriented bottles in a line for delivery to a subsequent container handling machine.

It should be understood that the present disclosure is for the purpose of illustration only and that this invention includes all modifications and equivalents which fall within the scope of the appended claims.

We claim:

1. Container-orienting apparatus comprising a platform, means supported for movement along a predetermined path over the platform, said means containing uniformly spaced pockets open at the top, bottom and one end into which containers are adapted to be deposited in prone positions and to be supported therein by the underlying platform, means for moving the first means relative to the platform to present successive pockets above the platform, means for automatically depositing containers into the successive pockets at said place of presentation, a rail situated beyond the platform in the direction of movement of the first means and along the path of movement, said rail having a narrow upper edge at the level of the platform and being situated substantially midway between the ends of the pockets, said first means operating to move the containers successively from the platform onto the rail to a straddling position thereon such that the heavier ends of the containers drop downwardly through the open lower sides of the pockets to one side or the other of the rail depending upon the orientation of the container at the time of deposit and so that the lighter ends project upwardly through the open sides of the pockets, a support below the rail onto which the lower ends of the containers drop, guides on the support operating on the containers moved therealong progressively to erect the containers so that they stand upright, said rail terminating at a predetermined distance beyond the platform and said guides converging beyond the end of the rail to form the containers into single file, said guides extending away from the path of movement of the first means and at its place of departure displacing the containers from the open ends of the pockets, and a conveyor situated below the guides in the plane of the support for receiving the containers displaced from the open ends of the pockets and conveying them away.

2. Container-orienting apparatus according to claim 1, wherein the guides form in conjunction with the rail two paths and beyond the rail a single path and there is means at the junction of the two paths with the one path to transfer the containers from said two paths to the one path.

3. Apparatus according to claim 2, wherein there is a pivotally mounted gate at the end of the rail movable from one guide to the other.

4. Apparatus according to claim 1, wherein the means for moving the containers along the support continues to move the containers along said one path onto the conveyor.

5. Apparatus according to claim 1, comprising means for holding the containers within the pockets until they are moved onto the rail.

6. Apparatus according to claim 5, wherein there are air jets located beyond the means for holding the containers in the pockets.

7. Apparatus according to claim 1, wherein the means for depositing the containers in the openings in said first means is situated above said platform in the path of movement of the openings, and there is means yieldably engaged with said first means at the side moving away from said means for depositing containers in the openings for holding the containers down within said openings until they are moved onto the rail.

8. Apparatus according to claim 1, wherein there are fingers supported above the first means in positions to engage the opposite ends of the containers as they are moved onto the rail operable to apply downward pressure on the opposite ends of the containers such that the ends last to be engaged by said fingers are depressed.

9. Apparatus according to claim 8, wherein the air jets are located beyond said fingers.

10. Container-orienting apparatus according to claim 1, comprising means situated at opposite sides of the rail beyond the place of deposit operable by engagement with the heavier ends of the containers to assist in depressing the heavier ends downwardly into engagement with said support.

11. Container-orienting apparatus according to claim 10, wherein said last-named are air jets.

12. Apparatus according to claim 1, wherein the pockets have opposed spaced parallel sides comprising leading and trailing sides with respect to the direction of movement of the conveyor, the vertical depths of which are substantially equal to the thickness of the containers.

13. Apparatus according to claim 12, wherein the trailing sides of the pockets in the conveyor in respect to the direction of movement of the conveyor are beveled.

14. Container-orienting apparatus comprising a platform, a rotary conveyor containing peripherally spaced radial pockets open at the top, bottom and outer ends, into which containers are adapted to be deposited in prone positions and to be supported therein by the underlying platform, means supporting the rotor for movement of the pockets along a predetermined circular path above the platform, means for automatically depositing containers in the successive pockets as they are presented to the platform, a rail situated below the rotary conveyor, said rail extending acurately around the axis of the rotary conveyor between the imaginary circle defined by the loci of movement of the inner and outer ends of said radially disposed pockets, means for effecting rotation of said rotary conveyor relative to the platform and rail to move the containers onto and along the rail in straddling positions such that the heavier ends of the containers drop downwardly through the open lower sides of the pockets to one side or the other of the rail depending upon the orientation of the containers at the time of deposit and such that the lighter ends project upwardly through the open top sides, a support below the rail onto which the lower ends of the containers drop to be supported thereby in upwardly inclined positions leaning against the rail, said rotary conveyor being operable to move the containers along said support, and means on the support for progressively erecting the containers and arranging them in a single file as they are moved therealong comprising guides at opposite sides of the rail which converge in the direction of movement of the containers, said guides in conjunction with the rail providing the two paths, one at each side of the rail and beyond the rail a single path, and means at the end of the rail for transferring the containers from the two paths to the one path.

15. Apparatus according to claim 14, wherein the pockets in the conveyor are of a vertical depth substantially equal to the thickness of the containers.

16. Container-orienting apparatus comprising a platform, means supported for movement along a predetermined path over the platform, said means containing uniformly spaced pockets open at the top, bottom and one end into which containers are adapted to be deposited in prone positions, and to be supported therein by the platform, means for moving the first means relative to the platform to present successive pockets above the platform, means above the platform for supporting a plurality of containers above the first means for deposit one at a time into the pockets in the first means as the pockets are moved into position above the platform, a rail situated beyond the platform in the direction of movement onto which the containers occupying the pockets are moved, said rail being adapted to support the containers intermediate their ends and to allow the containers to drop downwardly through the pockets and the other end extending upwardly through the pockets, at one side or the other of the rail depending upon the disposition of the heavier ends of the containers at the time they are deposited in the pockets, a support below the rail onto which the lower ends of the containers drop, and guide means on the support situated along the path of movement of the pockets operable to erect the containers as they travel along the support by progressively displacing said lower ends of the containers toward the rail, said guide means converging beyond the terminal end of the rail so as to arrange the containers in single file.

17. Apparatus according to claim 16, wherein the means for supporting a plurality of containers comprises a magazine open at the bottom and top and of a depth to hold a stack of containers in superposed relation, said magazine being supported above the platform with its open lower end juxtaposed with the path of movement of the pockets in the conveyor, an inclined track supported with an end adjacent the open top of the magazine through which the containers are adapted to slide into the magazine, and means at the open top of the magazine adjacent the end of the track operable to guide containers into the open end and to limit the number of containers which may enter the magazine to a predetermined number.

18. Apparatus according to claim 17, wherein there is an apron at the lower end of the magazine at the side from which the containers leave the magazine yieldably engaged with the upper side of the rotary conveyor, and wherein there are air jets situated beyond the apron in thhe direction of rotation in a position to act upon the containers as they emerge from beneath the apron onto the rail.

19. Apparatus according to claim 17, wherein said last means has spaced downwardly inclined edges which apply downward pressure to the stack of containers in the magazine.

20. Apparatus according to claim 17, comprising detector means situated on the chute operable in the absence of containers on the track in a position to slide into the magazine to stop the conveyor.

21. Apparatus according to claim 17, comprising guides mounted on the chute in the path of movement of the containers along the chute toward the magazine operable by engagement therewith to stabilize flow of the containers along the chute.

22. Apparatus according to claim 21, comprising means for adjusting the position of the guides relative to the bottom side of the chute.

23. Apparatus according to claim 17, comprising means at the top of the magazone operable to assist transfer of containers from the chute into the magazine.

24. Apparatus according to claim 23, wherein said last means comprises an air jet.

25. Apparatus acording to claim 16, wherein the means for supporting a plurality of containers comprises a hopper open at its bottom and top and supported with its open bottom above the path of movement of the openings in the conveyor, an inclined chute supported with its lower end adjacent the open top of the hopper along which the containers are adapted to slide into the open top of the hopper, and means situated partly in the open top of the hopper operable to promote such downward sliding movement of the containers into the open top and to apply yielding pressure to the topmost container in the hopper.

26. Apparatus according to claim 25, wherein there is a detector mounted on the chute to determine the presence of containers on the chute ready to enter the hopper, said detector being operable in the absence of containers so located to stop the wheel and conveyor.

27. Apparatus according to claim 25, wherein said last means comprises a wheel, an arm pivotally supported at one end, means rotatably mounting the wheel at its other end, said arm being angularly movable relative to the open top of the hopper to permit the wheel to move to and from the open top, an abutment for limiting movement of the arm to a position such that the lower portion of the wheel enters the open top to an extent such that its surface is substantially tangent to the path of movement of the containers moving from the track into the hopper, a spring urging the arm against the abutment and a motor operably connected to the wheel for effecting its rotation.

28. Apparatus according to claim 27, wherein there is means drivably connecting the motor to the wheel which slips when the traction between the wheel and container exceeds a predetermined maximum.

29. Apparatus according to claim 25, wherein said last means comprises a wheel and means for effecting rotation thereof in a direction such that the surface of the wheel travelling in the hopper moves in a direction to push the ends of containers entering the hopper from the chute into the hopper.

30. Apparatus according to claim 29, wherein the wheel has a tractive surface.

31. Apparatus according to claim 25, wherein said last means comprises a wheel, means supporting the wheel for movement toward and from the open top of the hopper, a motor for effecting rotation of the wheel, and spring means connected to said wheel support yieldably holding the wheel in a predetermined position with a portion of its surface within the open top in substantially tangential relation to the path of movement of the containers from the chute into the hopper.

32. Apparatus according to claim 31, wherein there is means limiting downward movement of the wheel.

33. Apparatus according to claim 31, wherein there is means limiting upward movement of the wheel.

* * * * *